United States Patent [19]

Ennerst et al.

[11] 4,247,495
[45] Jan. 27, 1981

[54] METHOD OF PRODUCING PUO$_2$/UO$_2$/-NUCLEAR FUELS

[75] Inventors: Karl Ennerst, Kleinostheim; Peter Funke, Rodenbach; Rainer Löb, Karlstein, all of Fed. Rep. of Germany

[73] Assignee: Alkem GmbH, Hanau, Fed. Rep. of Germany

[21] Appl. No.: 941,453

[22] Filed: Sep. 12, 1978

[30] Foreign Application Priority Data

Sep. 16, 1977 [DE] Fed. Rep. of Germany ....... 2741820
Jul. 27, 1978 [DE] Fed. Rep. of Germany ....... 2833054

[51] Int. Cl.$^2$ ............................................. G21C 21/00
[52] U.S. Cl. .................................. 264/0.5; 176/89; 252/301.1 R; 423/20
[58] Field of Search ...................... 176/89; 264/0.5; 423/20, 251; 252/301.1 R

[56] References Cited

U.S. PATENT DOCUMENTS

| 3,375,306 | 3/1968 | Russell et al. | 264/0.5 |
| 3,531,416 | 9/1970 | Akutsu et al. | 264/0.5 |
| 3,995,000 | 11/1976 | Butler et al. | 264/0.5 |
| 4,020,131 | 4/1977 | Feraday | 264/0.5 |

FOREIGN PATENT DOCUMENTS 2800329  7/1978  Fed. Rep. of Germany ........... 423/251

Primary Examiner—Leland A. Sebastian
Attorney, Agent, or Firm—Herbert L. Lerner

[57] ABSTRACT

Production of UO$_2$ nuclear fuel pellets containing PuO$_2$ in set amounts, which pellets are soluble in nitric acid and suitable for reprocessing without the aid of a special additive. Uranium oxide powder is mixed with 15 to 50% by weight of the mixture of plutonium oxide powder; the mixture milled and pressed into pellets. The pellets are sintered, comminuted, pressed to form pellets and the pellets comminuted to free-flowing granules. The free-flowing granules are mixed with UO$_2$ granules to obtain a desired UO$_2$/PuO$_2$ ratio, and the mixture pressed into pellets and sintered to form UO$_2$ nuclear fuel pellets containing PuO$_2$ soluble in nitric acid.

4 Claims, 1 Drawing Figure

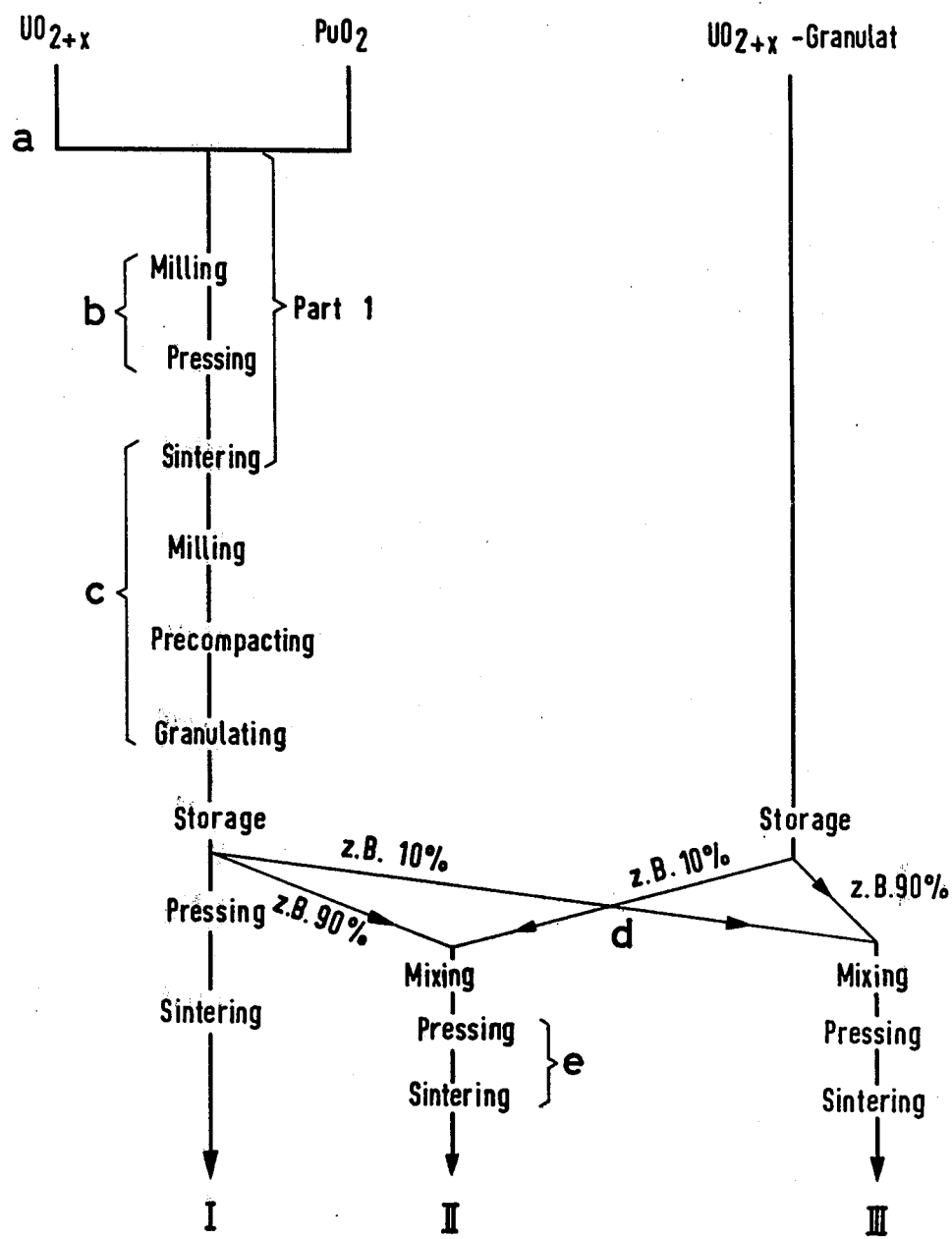

METHOD OF PRODUCING PUO₂/UO₂/-NUCLEAR FUELS

BACKGROUND OF THE INVENTION

1. Field of the Invention

The present invention relates to a method for the manufacture of $UO_2$ nuclear fuels containing $PuO_2$ in set amounts present as a solid solution with the $UO_2$, and in the reprocessing of such nuclear fuel with nitric acid, the $PuO_2$ is soluble in the nitric acid solvent.

2. Background of the Invention

In addition to uranium 235, the plutonium obtainable from burned-up fuel assemblies is known to be fissionable, also producing energy. Its best utilization is in so-called breeder reactors, in which over a certain period of time (doubling time) more plutonium is produced than the reactor itself consumes. But plutonium as dioxide mixed with uranium dioxide can also be burned up in so-called thermal reactors, producing energy. For this purpose, it is mixed with uranium as oxide in accordance with various methods and also used in various forms as nuclear fuel.

In the reprocessing of such nuclear fuels for obtaining the plutonium especially the breeder plutonium, difficulties are encountered, however, if the plutonium dioxide is not present as a solid solution with the uranium dioxide. This difficulty is due to the fact that it is not possible to dissolve as completely as possible the plutonium dioxide in the solvent $HNO_3$ provided for $UO_2$ fuel. Substantially complete dissolution of the plutonium dioxide is necessary for the reprocessing. This is possible only if additives, such as fluoric acid or hydrofluoric acid or fluorine ions or other additions containing dissolving ions, are admixed. In view of the corrosive action of the fluorine ion or of fluoric acid or also other dissolving ions on parts of the installation, as well as particularly also in view of the negative effects of adding fluorine ions in the glassification or encapsulation of the waste from the reprocessing, one endeavors to keep them but of the process.

A number of processes are known in principle, by which homogeneous solid solutions and soluble plutonium dioxide nuclear fuel can be produced, as for instance, melting the oxides $UO_2$ and $PuO_2$; the joint precipitation of different or similar compounds of uranium and plutonium; as well as also thorough milling of both oxide components, as described in the German Published Prosecuted Application No. 1 571 343.

However, the methods known to date are either too laborious and expensive such as, for instance, jointly melting the uranium dioxide and the plutonium dioxide at above 2000° C., or the method is difficult to control and, in particular, requires the presence of an aqueous solution of the uranium and the plutonium, which is not a simple procedure. Furthermore, the residue insoluble in nitric acid which is left in most of the processes of joint precipitation, as well as in the dry milling processes known so far, is not small enough in all cases to ensure the reprocessing of burned-up fuel with high reliability without the addition of fluorine ions or the use of other measures. The reprocessing aspect, however, is of paramount importance for the future of nuclear reactor technology.

Experiments have shown that, for example, in the preparation of mixed oxides of 75% $UC_{2+x}$ powder and 25% $PuO_2$ powder, which have been mixed by ball milling for several hours, and after sintering the powder, pressed into pellets, at 1700°C. for four hours, an insoluble plutonium content of about 3%, referred to the plutonium input, was found. On the basis of these findings, it can be assumed as certain that the nuclear fuel prepared in accordance with German Published Prosecuted Application No. 1 571 343, column 3, lines 18 to 23, also does not have sufficient solubility, as there, the milling and sintering is likewise performed only once.

As found in the literature (e.g. Report of Oak Ridge National Laboratory No. ORNL/TM-5909), the results of dissolution tests on non-irradiated mixed oxides which were prepared by joint precipitation of ammonium diuranate and plutonium hydroxide and, further, processing into nuclear fuel pellets, scatter from 0.1 to 1% of the undissolved plutonium referred to the plutonium input.

In various investigations, it has also been found that a uranium-containing phase is present in the undissolved residue, in addition to a plutonium-containing phase. This result of the investigation shows that on the one hand, interdiffusion of the two compounds of the uranium and the plutonium has taken place, i.e. that pure plutonium dioxide is no longer present but that, on the other hand, there is a lower limit in the series of possible compositions of the uranium and plutonium dioxide, above which also completely homogeneous solid solutions of the uranium and plutonium dioxide upon subsequent reprocessing with nitric aicd results in insoluble plutonium oxide. On the basis of the presently known results, it can be assumed that this lower limit is at a composition of about 50% uranium dioxide and about 50% plutonium dioxide.

In this connection, it is worthy of note that it was found during the so-called post-irradiation investigation on mixed-oxide fuels irradiated in the reactor, that during the irradiation, demixing, i.e. separating out, of uranium and plutonium dioxide took place to a certain extent, with a preferred influence being observed in the temperature and stoichiometry gradient. This can have the result that, after irradiation, a higher concentration of plutonium is present in certain zones in the fuel rod than before the irradiation. Taking the investigation results mentioned above, into consideration, it can be expected in the case of mixed-oxide fuels with a plutonium content of more than 50% that fuels which were soluble prior to the irradiation exhibit insoluble components in certain zones after insertion into the reactor.

SUMMARY OF THE INVENTION

An object of the present invention is to provide a method for manufacturing mixed-oxide fuel pellets prepared by treating dry, solid uranium oxide and plutonium oxide which mixed-oxide fuel pellets are soluble in nitric acid and suitable for reprocessing without the aid of an additive such as hydrofluoric acid. Another object of the invention is to provide a method for producing a mixed-oxide pellet which has a solubility in nitric acid which is more than 99% with 95% certainty on the basis of measured values, referred to the plutonium content. A further object of the invention is to provide a method for the manufacture of mixed-oxide fuels with differently adjustable plutonium dioxide contents in a simple and efficient manner.

With the foregoing and other objects in view, there is provided in accordance with the invention, a method for the manufacture of $UO_2$ nuclear fuel pellets containing $PuO_2$ in set amounts, which pellets are soluble in nitric acid, which includes (a) mixing uranium oxide powder having oxygen in stoichiometric excess of the dioxide, with plutnium dioxide powder in an amount of 15 to 50% plutonium dioxide by weight of the mixture of uranium oxide and plutonium dioxide, (b) milling the mixture of uranium oxide powder and plutonium dioxide powder and pressing the milled mixture to form pellets, (c) sintering the pellets in a reducing atmosphere in a furnace, communiting the sintered pellets to primary grain sizes of less than 2 μm by milling, pressing the comminuted grains to form pellets, and comminuting the pellets to free-flowing granules, (d) mixing the free-flowing granules with uranium oxide granules in an amount to obtain a desired $UO_2/PuO_2$ ratio in the resultant mixture, and (e) pressing the resultant mixture into pellets and sintering the pellets to form $UO_2$ nuclear fuel pellets containing $PuO_2$ soluble in nitric acid.

In accordance with the invention, there is provided a method for the manufacture of $UO_2$ nuclear fuel pellets containing $PuO_2$ in set amounts suitable for fast nuclear reactors, which pellets are soluble in nitric acid, which includes (a) mixing uranium oxide powder having oxygen in stoichiometric excess of the dioxide, with plutonium dioxide powder in an amount of 15 to 50% by weight of the mixture of uranium oxide and plutonium dioxide to obtain a desired $UO_2/PuO_2$ ratio in the resultant mixture suitable for producing $UO_2$ nuclear fuel pellets containing $PuO_2$ in set amounts for fast nuclear reactors, (b) milling the mixture of uranium oxide powder and plutonium dioxide powder and pressing the milled mixture to form pellets, (c) sintering the pellets in a reducing atmosphere in a furnace, comminuting the sintered pellets to primary grain sizes of less than 2 μm by milling, pressing the comminuted grains to form pellets and comminuting the pellets to free-flowing granules, (d) and pressing the free-flowing granules into pellets and sintering the pellets to form $UO_2$ nuclear fuel pellets containing $PuO_2$ soluble in nitric acid and suitable for fast nuclear reactors.

Other features which are considered as characteristic for the invention are set forth in the appended claims.

Although the invention is illustrated and described herein as embodied in a method for producing $PuO_2$-/$UO_2$-nuclear fuel, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which is shown a flow sheet schematically illustrating the process steps of the present invention.

DETAILED DESCRIPTION OF THE INVENTION

The starting materials with their chemical formulas are indicated on the first line of the drawing. On the left-hand side of the drawing are shown the process steps (a), (b) and (c). These result in an intermediate product which is stored. The further processing of the intermediate product by pressing and sintering leads to Product I, shown in the lower left-hand corner of the drawing, which has the highest $PuO_2$ content. A mixture of the intermediate product from process step (c) with $UO_2$ granuleate, i.e. granules, is effected in process step (d). Two different mixing ratios of intermediate product to $UO_2$ granules of 90% intermediate product to 10% $UO_2$ granules and 10% intermediate to 90% $UO_2$ granules are given in the drawing. This is to show that by means of process steps (c) and (d) practically any desired fuel specification can be realized as far as plutonium content is concerned, quickly and with a minimum of technical means. Products II and III, shown to the right of Product I in the drawing, are then generated, corresponding to the different mixing ratios.

The process steps of milling, pressing and sintering under the designation Part 1 of the drawing are known and correspond to the state of the art as shown by German Published Prosecuted Application No. 1 571 343. However, one of the problems with which the invention is particularly concerned, namely substantially complete solubility in nitric acid suitable for reprocessing, is not mentioned in the German Publication. The following Comparative Example 1 shows that the solubility of the plutonium content attainable with these process steps of the prior art which is the problem to which this invention is addressed, is not satisfactory.

COMPARATIVE EXAMPLE 1

Uranium oxide ($UO_{2+x}$) with a percentage of about 75% and Pu dioxide with a percentage of about 25% were mixed in a mixer and subsequently milled together in a ball mill. The percentages are by weight based on the mixture. After a milling period of four hours, the powder was taken out of the mill and subsequently pressed without particular attention as to the form of the pressed powder or the density of the material, to obtain a readily transportable material with intimate contact of the different grains of $UO_2$ and $PuO_2$. Usual values of density were scattered between 5.0 and 6.0 g/cm$^3$, but depending on the type of powder, other density values can also be obtained.

These pellets and also fragments thereof were sintered in a sintering furnace in a reducing atmosphere (mixture of inert gas and hydrogen) at a temperature of 1700° C. The holding time at sintering temperature was about four hours.

The date, attainable with this procedure, regarding stoichiometry-oxygen content, $O_{2+x}$, density in g/cm$^3$ and solubility in nitric acid of the plutonium content are listed in the following Table I:

TABLE I

| | Milling 1 | Pressing 1 | Sintering 1 |
|---|---|---|---|
| Stoichiometry | 2.12 | — | 1.97 |
| Density | — | 5.9 | 10.2 g/cm$^3$ |
| Solubility of the Pu Content | 2.6% | — | 97.1% |

As is seen therefrom, the solubility of the plutonium content is only 97.1%.

The process of the present invention starts with the sintered product of the prior art and subjects it to treatment as explained hereinafter to obtain the improved results. After the mentioned sintering process, the annealed material was comminuted down to a grain size of less than 1 mm. The comminuted material was placed in a ball mill and again milled for six hours down to a primary grain size of less than 2 μm. After the milling, the powder was pre-compacted in a press. Contrary to the first-mentioned pressing, careful pressing for blank or pellet densities as uniform as possible is desirable here. The pressed blanks or pellets were subsequently comminuted to form a highly flowable granulate, i.e. free-flowing granules which readily pour, similar to fluid. This highly flowable granulate was subsequently formed into the nuclear fuel pellets to meet the requirements such as density of the pellets, height, special shapes (for instance, dishing at the two end faces). The so-called blanks were subsequently sintered in a second sintering process in an atmosphere of an inert gas/hydrogen mixture, in which again 1700° C. was prescribed as the maximum temperature with a holding time of four hours.

The results of this further treatment in the method in accordance with the invention are listed in the following Table II:

TABLE II:

|  | Milling 2 | Pressing 2 | Sintering 2 |
|---|---|---|---|
| Stoichiometry | 2.06 | — | 1.96 |
| Density | — | 7.9 | 10.6 g/cm$^3$ |
| Solubility of the Pu Content | 97.1 | — | 99.8% |

It can be seen therefrom that now the solubility of the plutonium content is 99.8%. This procedure corresponds to that producing Product I as shown in the left-hand side of the drawing.

In the process mentioned in German Published Prosecuted Application No. 1 571 343, in which, without reference to the tests performed here on the solubility of the plutonium dioxide component, renewed milling and sintering of already milled and sintered powder mixtures are carried out, so-called virgin powder $U_3O_x$ and $PuO_2$ is added. No statement is made regarding the solubility of the nuclear fuel prepared by this method; however, the solubility must be less than that resulting from the process according to the present invention because of the admixture of virgin powders (raw powders) required by the German process.

Our own tests have shown that in a nuclear fuel, of which about 40% consisted of already sintered and milled material and 42% of virgin $UO_{2+x}$ and approximately 18% of virgin $PuO_2$, a maximum solubility of only about 72% could be achieved, referred to the total plutonium content present in the nuclear fuel.

The method according to the invention, in contrast, offers not only the advantage of practically complete solubility of the plutonium content, but also that of uncomplicated production of practically any nuclear fuel specification by means of storing the intermediate product prepared in the process step (c). This will be illustrated by the following Example 2:

EXAMPLE 2

Uranium dioxide and plutonium oxide were mixed, milled, pressed, sintered, milled again, pre-compacted and granulted in the same manner and in the same ratios as in Example 1. The granulate i.e. granules was homogenized in one lot and put into storage. Analyses were performed on representative samples for the purpose of determining all data required for the further processing, such as the plutonium isotope vector, the plutonium content, the uranium isotope vector, the uranium content, the bulk density, the sinterability, etc.

At the same time, a $UO_2$ granulate, i.e. granules, with specified powder date such as density of the granulate, grain shape of the granulate, sinterability of the granulate, uranium content and the isotope vector of the uranium, was produced in a $UO_2$ processing plant and delivered. The specifications for the granulate depend in essence on the specifications required for the $UO_2/PuO_2$ granulate. It was ensured thereby that the two granulates are compatible, i.e. pressed and sintered well.

For manufacturing a mixed-oxide fuel, for instance, for thermal nuclear power plants, 17.5% of the $UO_2$-$PuO_2$ granulate and 82.5% of the $UO_2$ granulate were weighted and mixed together. After mixing, the predetermined and adjusted Pu/U+Pu fission material content was checked once more. Thereupon the blanks of specified shape and dimensions were pressed and sintered.

The measured product data are listed in the following Table III:

TABLE III

|  | $UO_2$ Granulate | $UO_2/PuO_2$ Granulate as per process step c | Nuclear Fuel Pellets |
|---|---|---|---|
| Density | 6.5 | 7.0 | 10.4 g/cm$^3$ |
| Pu Content | — | 22.0 | 3.9% by wt. |
| U Content | 87.8 | 66.0 | 84.3% by wt. |
| Stoichiometry | 2.05 | 2.10 | 1.98 |
| Av.Granule Size | $\bar{x}_{50} = 180$ μm | $\bar{x}_{50} = 180$ μm | — |
| Solubility | 100 | 97.1 | 99.8% |

The end product, which according to the flow sheet in the attached drawing falls in the product group II/III, therefore likewise exhibits a solubility of the plutonium content in nitric acid of 99.8%.

The two examples mentioned are given only for better illustration; the data given therein such as sintering temperature, holding time at the sintering temperature, percent Pu content, etc. are not limiting.

Thus, temperatures other than 1700° C. are also possible, but a lower temperature than 1400° C. is not desirable, as then the diffusion processes proceed too slowly. A temperature of 1800° C. represents at present an upper limit due to the technical limitations in furnace design. Gas mxitures other than inert gas/hydrogen mixtures are also conceivable as the sintering atmosphere, but according to the present state of the art, the latter is preferable since furnaces of larger size for temperatures of 1700° C. are usually laid out so that they can be operated only in a reducing atmosphere. For safety reasons (oxygen-hydrogen gas explosion), the hydrogen usually provided for reduction purposes must be diluted with the inert gas.

In this connection, it should further be pointed out that the maximum plutonium content in the intermediate product of the process stage (c) should be smaller than 50%, as otherwise the risk of local plutonium enrichment due to the demixing processes i.e. separating effect of uranium and plutonium mentioned at the outset and thus, partial insolubility of the plutonium can occur in the reprocessing.

Important advantages of the method according to the invention are:

Simple procedure, because the specified fission material content is adjusted only shortly prior to the pressing of the nuclear fuel pellets by weighing the contents, calculated in advance, of the intermediate product after step (c) and $UO_2$ granulate. From this it further follows that no special measures for cleaning the mills are required when the specified fission material is changed.

The processing of the starting materials is uniform for the mixed-oxide nuclear fuel, for thermal nuclear power plants as well as for mixed-oxide nuclear fuels for fast reactors, particularly fast breeders.

Substantial parts of the total process, namely, the process steps (a), (b) and (c), need not be carried out with the entire quantity of mixed-oxide nuclear fuel, so that only that part need to be processed under glove box conditions. If, for instance, a nuclear fuel for thermal nuclear power plants is to be manufactured, this corresponds only to about 10 to 15% of the total quantity of fuel.

Reprocesing of the nuclear fuel is simplified, because in addition to uranium content, the plutonium content is also practically completely soluble in nitric acid without the use of additives.

There is claimed:

1. Method for the manufacture of $UO_2$ nuclear fuel pellets containing $PuO_2$ in set amounts, which pellets are soluble in nitric acid, which comprises
   (a) mixing uranium oxide powder having oxygen in stoichiometric excess of the dioxide, with plutonium dioxide powder in an amount of 15 to 50% plutonium dioxide by weight of the mixture of uranium oxide and plutonium dioxide,
   (b) milling the mixture of uranium oxide powder and plutonium dioxide powder and pressing the milled mixture to form pellets or granules
   (c) sintering the pellets in a reducing atmosphere in a furnace, comminuting the sintered pellets to primary grain sizes of less than 2 $\mu$m by milling, pressing the comminuted grains to form pellets, and comminuting the pellets to free-flowing granules,
   (d) mixing the free-flowing granules with uranium oxide granules in an amount to obtain a desired $UO_2/PuO_2$ ratio in the resultant mixture, and
   (e) pressing the resultant mixture into pellets and sintering the pellets to form $UO_2$ nuclear fuel pellets containing $PuO_2$ soluble in nitric acid.

2. Method according to claim 1, wherein the process product of step (c), the free-flowing granules is at least in part sent to storage and is stored until processed further into nuclear fuel pellets of desired, possibly different plutonium content.

3. Method according to claim 1 or claim 2, wherein the $UO_2$ granules to be added according to step (d) is adjusted as to density, grain shape and sinterability in accordance with the $UO_2/PuO_2$ free-flowing granules of step (c).

4. Method for the manufacture of $UO_2$ nuclear fuel pellets containing $PuO_2$ in set amounts suitable for fast nuclear reactors, which pellets are soluble in nitric acid, which comprises,
   (a) mixing uranium oxide powder having oxygen in stoichiometric excess of the dioxide, with plutonium dioxide powder in an amount of 15 to 50% by weight of the mixture of uranium oxide and plutonium dioxide to obtain a desired $UO_2/PuO_2$ ratio in the resultant mixture suitable for producing $UO_2$ nuclear fuel pellets. containing $PuO_2$ in set amounts for fast nuclear reactors,
   (b) milling the mixture of uranium oxide powder and plutonium dioxide powder and pressing the milled mixture to form pellets,
   (c) sintering the pellets in a reducing atmosphere in a furnace, comminuting the sintered pellets to primary grain sizes of less than 2 $\mu$m by milling, pressing the comminuted grains to form pellets and comminuting the pellets to free-flowing granules,
   (d) and pressing the free-flowing granules into pellets and sintering the pellets to form $UO_2$ nuclear fuel pellets containing $PuO_2$ soluble in nitric acid and suitable for fast nuclear reactors.

* * * * *